United States Patent [19]

Karayannis et al.

[11] 4,256,866

[45] Mar. 17, 1981

[54] POLYMERIZATION PROCESS

[75] Inventors: Nicholas M. Karayannis, Naperville; Sam S. Lee, Hoffman Estates, both of Ill.

[73] Assignee: Standard Oil Company (Indiana), Chicago, Ill.

[21] Appl. No.: 696,811

[22] Filed: Jun. 16, 1976

[51] Int. Cl.³ .......................... C08F 4/66; C08F 10/06
[52] U.S. Cl. .................................. 526/142; 252/429 B; 526/128; 526/136; 526/138; 526/139; 526/141; 526/351
[58] Field of Search ........................................ 526/142

[56] References Cited

U.S. PATENT DOCUMENTS

| | | | |
|---|---|---|---|
| 3,058,963 | 10/1962 | Vanderberg | 526/153 |
| 3,129,209 | 4/1964 | Hague et al. | 526/142 |
| 3,219,648 | 11/1965 | Hill | 526/142 |
| 3,300,457 | 1/1967 | Schmid et al. | 526/142 |
| 3,510,465 | 5/1970 | Nakaguti et al. | 526/142 |
| 3,534,006 | 10/1970 | Kamaishi et al. | 526/142 |
| 3,984,350 | 10/1976 | Karagannis et al. | 526/142 |

FOREIGN PATENT DOCUMENTS

| | | |
|---|---|---|
| 44-27812 | 11/1969 | Japan . |
| 46-38975 | 11/1971 | Japan . |
| 927815 | 6/1963 | United Kingdom . |
| 998601 | 7/1965 | United Kingdom . |
| 1128090 | 9/1968 | United Kingdom . |
| 1147121 | 4/1969 | United Kingdom . |

*Primary Examiner*—Edward J. Smith
*Attorney, Agent, or Firm*—Wallace L. Oliver; William T. McClain; William H. Magidson

[57] ABSTRACT

In an alpha-olefin polymerization process using a transition metal halide-aluminum alkyl catalyst system, addition of minor, effective amounts of a sterically hindered 5- or 6-membered cyclic ether decreases the amount of low molecular weight or amorphous polymer produced.

4 Claims, No Drawings

4,256,866

POLYMERIZATION PROCESS

BACKGROUND OF THE INVENTION

This invention relates to alpha-olefin polymerization processes and particularly relates to catalyst systems in such processes which produce commercially acceptable levels of low molecular weight and, especially, amorphous polymers as determined by the amount of polymerized product which is soluble in n-hexane.

The polymerization of alpha-olefins to normally-solid, substantially crystalline polymers using heterogeneous catalysts comprising transition metal halides and aluminum alkyls now is well-known in the art. However, there is a continuing need in the industry for catalyst systems which have a high yield, as measured by the grams of crystalline product per gram of transition metal halide consumed, while producing a minimum amount of n-hexane-soluble polymer. In a slurry polymerization process which uses a hydrocarbon solvent, such as n-hexane, amorphous and low molecular weight polymer accumulates in the solvent which necessitates extensive solvent purification procedures. Since the economic value of such hexane-soluble polymer is lower than normally-solid, substantially crystalline product, the overall process becomes less efficient as the amount of n-hexane-soluble product increases.

In a solventless, liquid-phase bulk polymerization or in a vapor phase process, the production of polymers which contain more than about 2% of n-hexane-soluble product requires a separate extraction procedure to produce commercially acceptable products and makes these inherently efficient processes uneconomical. Therefore, polymerization processes which produce low amounts of n-hexane-soluble polymer while not adversely affecting polymerization yield are in demand.

Various catalyst components in addition to transition metal halides and aluminum alkyls have been disclosed to minimize n-hexane-soluble products in alpha-olefin polymerization. Such additional components include aliphatic amines, tetraorganosilyl compounds such as tetraalkyl-, tetraaryl- and tetraalkoxysilanes, sterically hindered cyclic amines, amine N-oxides and organotin sulfides. One such system is described in U.S. Pat. No. 3,950,268 incorporated herein by reference. 2-Methyltetrahydrofuran is disclosed as an additive in propylene polymerization in U.S. Pat. No. 3,441,551.

It is an object of this invention to discover catalyst additives which decrease n-hexane-soluble products while maintaining reasonable polymerization activity.

SUMMARY OF THE INVENTION

In a process to polymerize alpha-olefins to normally-solid, substantially crystalline polymer utilizing a catalyst comprising a transition metal halide and an aluminum alkyl, this invention comprises adding to such catalyst effective amounts of a sterically hindered 5- or 6-membered cyclic ether, whereby the amount of n-hexane-soluble polymeric product is decreased.

BRIEF DESCRIPTION OF THE INVENTION

In an alpha-olefin polymerization process using a transition metal halide-aluminum alkyl catalyst system, the addition to such system of minor amounts of a sterically hindered 5- or 6-membered cyclic ether decreases the amount of n-hexane-soluble products formed while maintaining the polymerization activity.

Suitable sterically hindered 5- or 6-membered cyclic ethers contain one or more oxygen atoms and include substituted tetrahydrofurans and tetrahydropyrans. The minimum steric hindrance which will yield an effective additive is either a dimethyl derivative or a monosubstituted cyclic ether where the substituent group has a steric size greater or equal to an isopropyl group. 2-Methyltetrahydrofuran (MTHF) is not effective. Representative compounds include 2,5-dimethyltetrahydrofuran (DMTHF), 2,2,4,4-tetramethyltetrahydrofuran (TMTHF), isochroman (IC), 2,5-dimethoxytetrahydrofuran (DMOTHF), 2-tetrahydrofurfuryl tetrahydropyran (THFTHP) and the like. For polysubstituted cyclic ethers the substituent groups can be alkyl, aryl, alkoxy and their derivatives containing from 1 to about 20 carbon atoms. The cyclic ethers used in this invention should be compatible with the other components of the catalyst system.

The exact amount of the additives useful in this invention varies depending upon the precise make-up of the other catalyst components and upon the polymerization conditions. Typically effective amounts range from about one-tenth mol percent to about 60 mol percent and preferably about 5 to 30 mol percent of the transition metal halide.

The cyclic ethers of this invention can be utilized in conjunction with effective catalyst coadditives such as hydrogen sulfide, sulfur dioxide, alkyl silicates, orthosilicates esters, Lewis bases such as phosphines, phosphites, phosphates, aromatic amines, amine oxides, tertiary aliphatic amines and ethers or an organometallic chalcogenide such as bis(trialkyltin) sulfide (BTS). These additional additives can be present in minor amounts ranging from about one-tenth to 30 mol percent and preferably about 5 to 20 mol percent of the transition metal halide in the catalyst system.

The catalyst system described in this invention contains (a) an alkylaluminum compound and (b) a transition metal halide in addition to minor amounts of other additives.

Useful aluminum alkyls include trialkylaluminum, dialkylaluminum halides and mixtures thereof. Also catalytic effective amounts of such trialkylaluminums, dialkylaluminum halides and their mixtures can be used in conjunction with aluminum alkyl dihalides. An alkylaluminum halide-aluminum alkyldihalide mixture commonly is called alkylaluminum sesquihalide. Useful halides include bromides and chlorides and useful alkyl radicals contain from two to about six carbon atoms. The preferable halide is chloride and the preferable alkyl radical is ethyl. Diethylaluminum chloride (DEAC) or a mixture of DEAC and triethylaluminum (TEA) is most preferable. In a trialkylaluminum-dialkylaluminum halide mixture, the preferred amount of trialkylaluminum is about 20 to 50 mol percent. In a trialkylaluminum-alkylaluminum dihalide mixture, the preferred amount is about 30 to 70 mol percent and most preferably about 40 to 60 mol percent.

The transition metal halides useful as a component in the catalyst system of this invention are halides of transition metals of Groups IVB, VB and VIB of the Periodic Table. Preferably, the transition metal halide is a chloride of titanium, vanadium, chromium, molybdenum or zirconium. Most preferably, titanium trichloride and especially activated titanium trichloride is used. Titanium trichloride can be activated to a high degree of polymerization activity by chemical or physical means, such as by incorporating aluminum chloride in the titanium trichloride catalyst matrix or by comminuting the titanium trichloride catalyst component. One useful activated titanium trichloride has an approximate stoichiometric formula of TiCl$_3$.$\frac{1}{3}$ AlCl$_3$ and has been mechanically activated. Further, titanium trichloride can be activated by forming adducts with Lewis bases such as ethers or by supporting the titanium trichloride on a catalytically inert substance such as a metal oxide or salt.

The molar ratio of transition metal halide to aluminum alkyl in a catalyst system can range from about one-tenth to about 10 and typically is about 1 to 3. The amount of catalyst in a polymerization depends on the reactor size and type and on the amount and type of olefin monomer and is known to the skilled artisan.

Since the catalyst systems used in this invention are sensitive to oxygen and moisture, suitable precautions should be taken during catalyst preparation, transfer and use.

The polymerization process of this invention can be utilized at pressures ranging from atmospheric to about 20,000 p.s.i.g. and preferably from about 30 to 1000 p.s.i.g.

The polymerization time depends on the process utilized. In batch processes the polymerization contact time usually is about one-half to several hours and typically is one to four hours in autoclave processes. In a continuous process, contact time in the polymerization zone is controlled as required and typically ranges from about one-half to several hours. Since in this type of process unreacted monomer continuously can be recycled into the polymerization zone, the contact time can be shorter than in a batch process.

The liquid organic solvents used in the slurry polymerization technique include aliphatic alkanes and cycloalkenes such as pentane, hexane, heptane or cyclohexane; a hydrogenated aromatic compound such as tetrahydronaphthalene or decahydronaphthalene; a high molecular weight liquid paraffin or mixtures of paraffins which are liquid at the reaction temperature; an aromatic hydrocarbon such as benzene, toluene or xylene; or a haloaromatic compound such as chlorobenzene, chloronaphthalene or o-dichlorobenzene. Other suitable solvent include ethylbenzene, isopropylbenzene, ethyltoluene, n-propylbenzene, diethylbenzenes, mono- and di-alkylnaphthalenes, n-pentane, n-octane, isooctane and methyl cyclohexane. Preferably, liquid hydrocarbons are used; most preferably, hexane is the polymerization medium. Although the nature of the solvent can be varied considerably, the solvent should be liquid under the reaction conditions and should be relatively inert. Advantageously, the solvent used can be purified prior to use by distillation or by reaction with an aluminum alkyl to remove impurities.

The polymerization temperature depends upon the specific catalyst system used and can range from below about 0° C. to above about 120° C. However, at temperatures below about 0° C. the polymerization rate slows and reactor residence times become unreasonably long, while at temperatures above about 120° C. the polymerization rate is too high which results in excessive amounts of n-hexane-soluble products. Preferably, the temperature ranges from about 2° C. to about 95° C. and most preferably from about 50° C. to about 80° C.

This invention is most useful in polymerizing propylene to a normally solid, substantially crystalline polymer, although propylene also can be polymerized with ethylene or other alpha-olefins to form random, pure-block, terminal block and multisegment copolymers. Additionally, other alpha-olefins such as ethylene or styrene can be polymerized by this invention. Generally, polymers and copolymers of alpha-olefins with a structure of $CH_2=CHR$ where R is either hydrogen or an aliphatic, cycloaliphatic or aromatic radical containing up to about eight carbon atoms can be produced using this invention.

The normally solid poly(alpha-olefins) prepared according to this invention have molecular weights ranging from about 50,000 to 5,000,000 and typically range from about 200,000 to 2,000,000. The molecular weights of such poly(alpha-olefins) can be controlled by methods known to the art, such as by polymerizing in the presence of dialkyl zinc compounds or, preferably, in the presence of hydrogen in an amount determined by the molecular weight distribution desired.

This invention is demonstrated but not limited by the following Examples.

EXAMPLES I-VIII

A series of bulk polymerizations were made in a one-liter Parr reactor. Polymerization was initiated by introducing into the reactor measured amounts of diethylaluminum chloride (DEAC) (25. wt.% in hexane), aluminum activated titanium trichloride (AA TiCl$_3$), catalyst additives propylene (460 p.s.i.g.) and hydrogen (3.5 p.s.i.g.). After two hours, the resulting product was deactivated by adding a mixture of 50 milliters of n-hexane and 10 milliliters of methanol and stirring for one hour. The product was filtered, washed with about 100 milliliters of n-hexane and enough methanol to remove any catalyst residues, dried for one hour at 90° C. and then weighed. The weight of the dried product divided by the weight of AA TiCl$_3$ used in the reaction is the Crystalline Yield. The combined filtrates were evaporated to dryness and the resulting Hexane Soluble product weighed. The results are shown in TABLE I.

TABLE I

| Ex. (Run) | DEAC (ml) | AA TiCl$_3$ (g) | BTS (ml) | Ether (ml)[1] | Crystalline Yield (g/g TiCl$_3$) | Hexane Solubles (%) |
|---|---|---|---|---|---|---|
| I | 2.2 | 0.1 | 0.03 | DMTHF (0.03) | 2534 | 1.26 |
| (A) | 2.2 | 0.1 | 0.03 | MTHF (0.03) | 2437 | 5.60 |
| (B) | 2.2 | 0.1 | 0.03 | MTHP (0.04) | 2181 | 4.30 |
| (C) | 2.2 | 0.1 | 0.03 | MTHP (0.04) | 2431 | 3.68 |
| II | 2.2 | 0.1 | 0.03 | IC (0.04) | 1613 | 1.38 |
| (D) | 2.2 | 0.1 | 0.03 | BPE (0.04) | 1447 | 2.55 |
| III | 1.2 | 0.1 | 0.03 | TMTHF (0.04) | 2376 | 2.80 |
| IV | 1.2 | 0.1 | 0.03 | DMTHF (0.045) | 2467 | 2.30 |
| V | 1.2 | 0.05 | 0.03 | TMTHF (0.04) | 2847 | 2.72 |
| VI | 1.2 | 0.05 | 0.03 | DMOTHF (0.03) | 975 | 2.80 |
| VII | 1.2 | 0.05 | 0.03 | DMOTHF (0.03) | 1084 | 3.71 |
| VIII | 1.2 | 0.1 | 0.04 | DMTHF (0.04) | 2138 | 3.61 |

[1]Abbreviations:
DMTHF = 2,5-dimethyltetrahydrofuran;
MTHP = 2-methyltetrahydropyran;
BPE = n-butyl phenyl ether;
DMOTHF = 2,5-dimethoxytetrahydrofuran
MTHF = 2-methyltetrahydrofuran;
IC = isochroman;
TMTHF = 2,2,4,4-tetramethyltetrahydrofuran;

EXAMPLES IX-XIII

In a procedure similar to that specified in Examples I-VIII, a series of polymerizations were carried out using an additive of this invention in conjunction with an additional modifier. The results are shown in Table II.

TABLE II

| Example (Run) | Catalyst Components | | | | Crystalline Yield (g/g TiCl₃) | Hexane Solubles (%) |
|---|---|---|---|---|---|---|
| | DEAC (ml) | AA TiCl₃ (g) | Additional Modifier (ml)[2] | Ether (ml)[2] | | |
| (E) | 2.6 | 0.1 | — | — | 1677 | 5.20 |
| (F) | 2.2 | 0.1 | — | — | 1872 | 4.74 |
| IX | 2.2 | 0.1 | TBA (0.03) | DMTHF (0.03) | 1628 | 3.99 |
| (G) | 1.2 | 0.05 | — | — | 3420 | 6.30 |
| (H) | 1.2 | 0.05 | TETP (0.04) | — | 2619 | 1.90 |
| X | 1.2 | 0.05 | TETP (0.03) | DMTHF (0.02) | 2936 | 1.70 |
| XI | 1.2 | 0.05 | TETP (0.02) | DMTHF (0.02) | 3055 | 3.70 |
| XII | 1.2 | 0.05 | TETP (0.02) | TMTHF (0.02) | 2911 | 3.00 |
| (J) | 1.2[1] | 0.05 | TBP (0.06) | — | 3004 | 1.79 |
| XIII | 1.2[1] | 0.05 | TBP (0.06) | DMTHF (0.04) | 3303 | 2.10 |

[1]Mixture of 1.0 milliliter of 25 wt.% DEAC and 0.18 milliliter of TEA.
[2]Abbreviations:
TBA = tri-n-butylamine;
TETP = triethylphosphate;
TBP = tri-n-butylphosphite;
DMTHF = 2,5-dimethyltetrahydrofuran;
TMTHF = 2,2,4,4-tetramethyltetrahydrofuran The data in the Examples show that the additives of this invention reduce n-hexane soluble product in an alpha-olefin polymerization without substantially reducing the overall polymerization activity.

We claim:

1. In a process to polymerize alpha-olefins to a normally-solid, substantially crystalline polymer utilizing a catalyst comprising a transition metal halide and an aluminum alkyl, the improvement comprising adding to such catalyst an effective amount of isochroman, whereby the amount of n-hexane soluble polymeric product is decreased.

2. The improvement of claim 1 wherein the alpha-olefin is propylene or a mixture of propylene and ethylene.

3. The improvement of claim 2 wherein the transition metal halide is a titanium trichloride.

4. The improvement of claim 3 wherein the aluminum alkyl is diethylaluminum chloride, triethylaluminum or a mixture thereof.

* * * * *